United States Patent [19]

Kwon

[11] Patent Number: 4,653,921

[45] Date of Patent: Mar. 31, 1987

[54] REAL-TIME RADIAL SHEAR INTERFEROMETER

[75] Inventor: Osuk Y. Kwon, San Jose, Calif.

[73] Assignee: Lockheed Missiles & Space Company, Inc., Sunnyvale, Calif.

[21] Appl. No.: 773,908

[22] Filed: Sep. 9, 1985

[51] Int. Cl.$^4$ .............................................. G01B 9/02
[52] U.S. Cl. .................................... 356/353; 356/354
[58] Field of Search ............... 356/345, 352, 353, 354, 356/355, 356

[56] References Cited

U.S. PATENT DOCUMENTS 3,829,219  8/1974  Wyant ............................. 356/354 X
4,413,909  11/1983  Pohle .................................... 356/354

OTHER PUBLICATIONS

Schmutz, L. E., et al., "Integrated Imaging Irradiance (I$^3$) Sensor: a New Method for Real-Time Wavefront Mensuration", *Adaptive Optical Components II*, v. 179, 1979, pp. 75-80.

Primary Examiner—Eugene R. LaRoche
Assistant Examiner—Steven J. Mottola
Attorney, Agent, or Firm—John J. Morrissey

[57] ABSTRACT

A real-time radial shear interferometer for monitoring the quality of the wavefront of an optical beam comprises (with reference to FIG. 3) a pair of beamsplitters (40, 45) and a pair of beam-folding mirrors (44, 46) arranged in Mach-Zehnder format. An afocal telescope (41) and a diffraction grating (30) cause a transmitted component of the beam to be separated into a plurality of diffraction maxima, and an afocal telescope (47) and a diffraction grating (31) cause a reflected component of the beam to be separated into a plurality of diffraction maxima. Diffraction beams formed from the transmitted component of the beam are combined with corresponding diffraction beams formed from the reflected component of the beam to produce a zeroth-order interferogram and positive and negative first-order interferograms. It is shown by Fourier analysis that a phase shift inherently occurs between the zeroth-order interferogram and the positive and negative first-order interferograms produced by optical interference between corresponding zeroth-order and positive and negative first-order diffraction beams.

4 Claims, 4 Drawing Figures

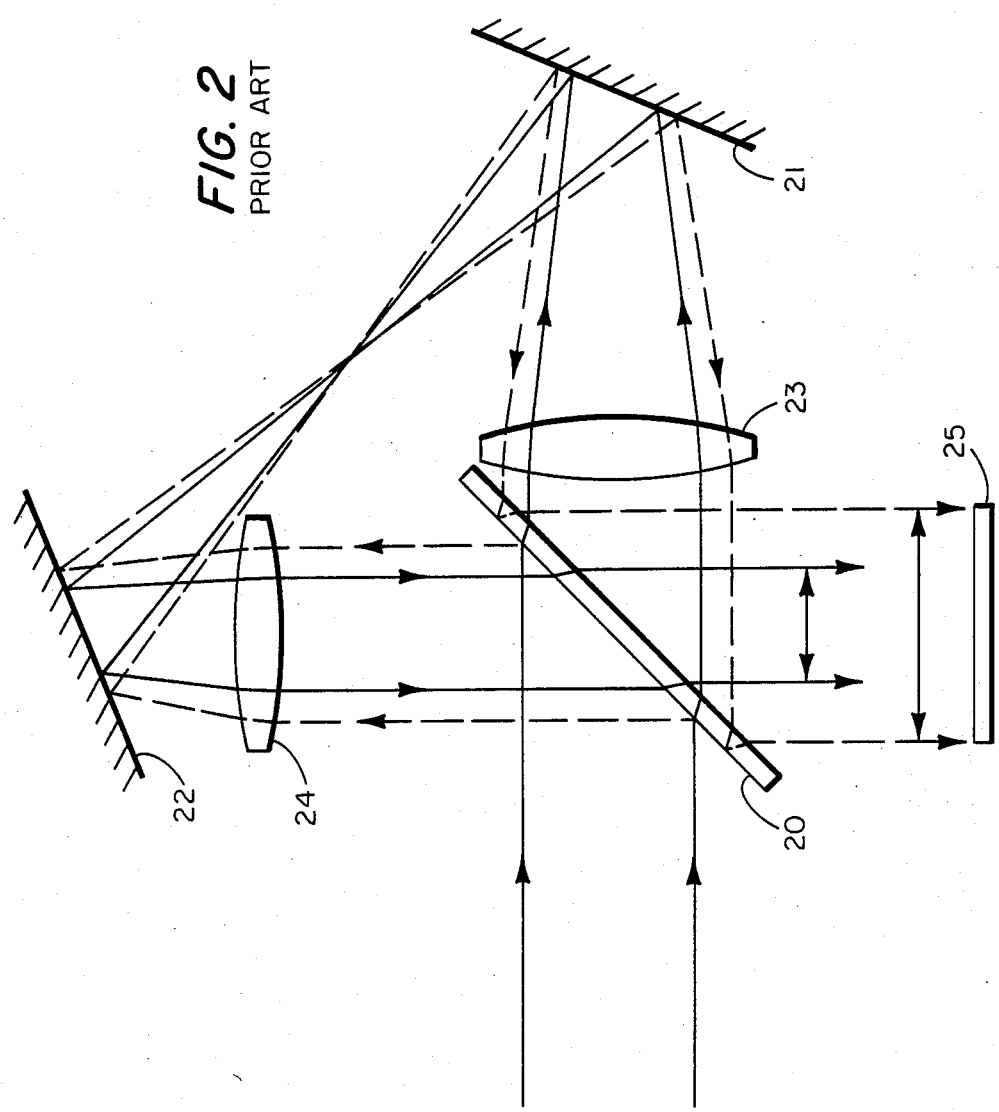

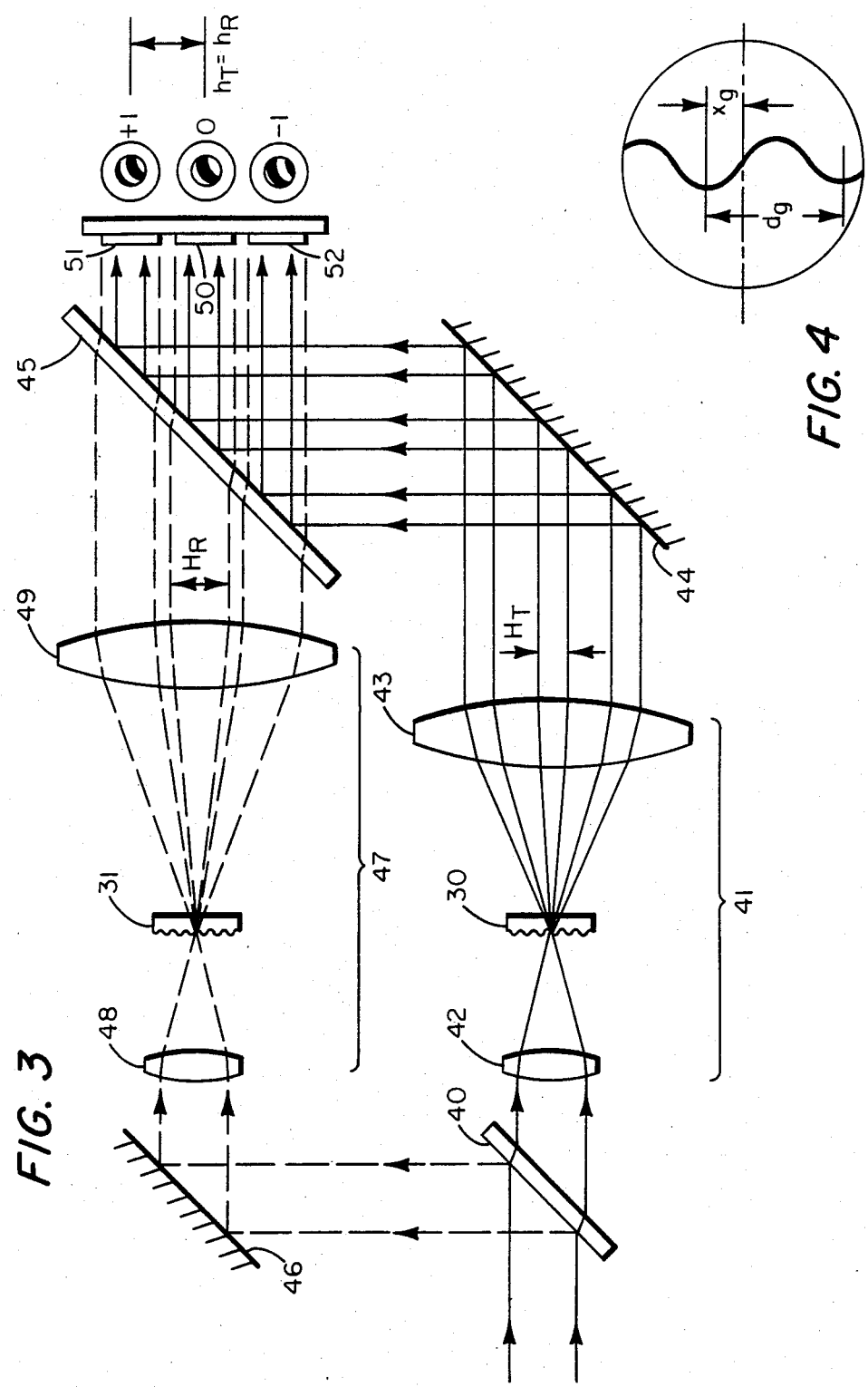

REAL-TIME RADIAL SHEAR INTERFEROMETER

TECHNICAL FIELD

This invention relates generally to optical interferometry, and more particularly to a phase-shifting interferometric technique for monitoring the quality of an optical wavefront in real time.

DESCRIPTION OF THE PRIOR ART

An overview of interferometric techniques used in the prior art was provided in a chapter entitled "Fringe Scanning Interferometers" by J. H. Bruning in *Optical Shop Testing*, edited by D. Malacara, John Wiley and Sons, pp. 409–437, (1978), and also in an article entitled "Interferometric Optical Metrology: Basic Principles and New Systems" by J. C. Wyant in *Laser Focus*, Vol. 65, pp. 65–71, (May 1982). Real-time interferometric techniques used in the prior art generally employed electro-optical devices with auxiliary waveplates, polarizers and moving parts.

An interferometric technique that is particularly relevant to the present invention is known as radial shear interferometry (RSI). References discussing radial shear interferometry include:

(a) D. S. Brown, "Radial-Shear Interferograms", *Interferometry N.P.L. Symposium* No. 11, Her Majesty's Stationery Office, London, p. 253, (1959);

(b) P. Hariharan and D. Sen, "Radial Shearing Interferometer", *J. Sci. Instrum.*, Vol. 38, p. 428, (1961); and (c) D. Malacara, "Mathematical Interpretations of Radial Shearing Interferometers", *Appl. Opt.*, Vol. 13, p. 1781 (1974).

A knowledge of radial shear interferometry as practiced in the prior art would be useful in understanding the present invention. Therefore, at this juncture, a conventional radial shear interferometer in Mach-Zehnder format is described with reference to FIG. 1, and a conventional radial shear interferometer in triangular format is described with reference to FIG. 2.

The radial shear interferometer of FIG. 1 comprises a pair of beamsplitters 10 and 11 and a pair of beam-folding mirrors 12 and 13 positioned in a rectangular Mach-Zehnder arrangement, i.e., with the beamsplitters 10 and 11 disposed opposite each other on two of the corners of a rectangle, and with the mirrors 12 and 13 disposed opposite each other on the other two corners of the rectangle. An incoming beam whose wavefront is to be monitored is divided by the beamsplitter 10 into a reflected component (whose boundary rays are indicated in FIG. 1 by broken lines) and a transmitted component (whose boundary rays are indicated in FIG. 1 by solid lines). The reflected component travels along a first arm of the interferometer from the beamsplitter 10 via the beam-folding mirror 12 to the beamsplitter 11. The transmitted component travels along a second arm of the interferometer from the beamsplitter 10 via the mirror 13 to the beamsplitter 11.

A beam-expanding afocal telescope 14 is positioned in the first arm of the interferometer between the mirror 12 and the beamsplitter 11, and a beam-contracting afocal telescope 15 is positioned in the second arm of the interferometer between the mirror 13 and the beamsplitter 11. A portion of the reflected component of the incoming beam (as expanded by the telescope 14) is transmitted by the beamsplitter 11 to a photosensitive array detector 16. A portion of the transmitted component of the incoming beam (as contracted by the telescope 15) is reflected by the beamsplitter 11 to the array detector 16. The expanded portion of the reflected component and the contracted portion of the transmitted component are concentric with respect to each other, and interfere with each other to produce an interferogram at the array detector 16.

The radial shear interferometer of FIG. 2 comprises a single beamsplitter 20 and a pair of beam-folding mirrors 21 and 22 positioned in a triangular arrangement. An incoming beam whose wavefront is to be monitored is divided by the beamsplitter 20 into a transmitted component (whose boundary rays are indicated in FIG. 2 by solid lines) and a reflected component (whose boundary rays are indicated in FIG. 2 by broken lines).

The transmitted component of the incoming beam is propagated along an optical path through the interferometer of FIG. 2 in a direction from the beamsplitter 20 via the mirror 21 to the mirror 22, and thence back to the beamsplitter 20. The reflected component of the incoming beam is propagated along the same optical path through the interferometer as the transmitted component, but in the opposite direction, i.e., from the beamsplitter 20 via the mirror 22 to the mirror 21 and thence back to the beamsplitter 20. A focussing lens 23 is positioned in the optical path between the beamsplitter 20 and the mirror 21. Another focussing lens 24 is positioned in the optical path between the mirror 22 and the beamsplitter 20.

The transmitted component of the incoming beam is converged by the lens 23 onto the mirror 21, which inverts the transmitted component and reflects it to the mirror 22. The transmitted component as thus inverted is reflected by the mirror 22 via the lens 24 to the beamsplitter 20. The lens 24 re-collimates the transmitted component so as to be coincident with (but opposite in direction to) the reflected component passing from the beamsplitter 20 to the mirror 22. A portion of the transmitted component of the incoming beam is then transmitted through the beamsplitter 20 to a photosensitive array detector 25.

The reflected component of the incoming beam is converged by the lens 24 onto the mirror 22, which inverts the reflected component and reflects it onto the mirror 21. The reflected component as thus inverted is reflected by the mirror 21 via the lens 23 to the beamsplitter 20. The lens 23 re-collimates the reflected component so as to be coincident with (but opposite in direction to) the transmitted component passing from the beamsplitter 20 to the mirror 21. A portion of the reflected component of the incoming beam is then reflected by the beamsplitter 20 to the array detector 25.

The focal lengths of the lenses 23 and 24, and the locations and orientations of the mirrors 21 and 22 with respect to the lenses 23 and 24, are such that the transmitted component is contracted and the reflected component is expanded with respect to the input beam. The portion of the transmitted component and the portion of the reflected component are concentric with respect to each other at the array detector 25, and produce an interferogram with a predetermined radial shear.

For both of the interferometers illustrated in FIGS. 1 and 2, one of the interfering portions of the components forming the interferogram has a larger diameter than the other. In the embodiment of FIG. 1, the portion of the reflected component as expanded by the telescope 14 has the larger diameter. In the embodiment of FIG.

2, the portion of the reflected component as expanded by the lens 23 has the larger diameter. In each embodiment, the larger-diameter one of the interfering portions of the two components into which the incoming beam is divided can be considered as a self-generated reference beam, and the smaller-diameter portion can be considered as the test beam whose wavefront is to be monitored for quality with respect to the wavefront of the reference beam.

Mathematically, a wavefront can be represented by a Zernike polynomial. The normalized reference beam wavefront can be expressed as a wave function $W_R(\rho,\theta)$, which can be expanded as $$W_R(\rho,\theta) = W_{20}\rho^2 + W_{040}\rho^4 + W_{131}y_0\rho^3 \cos\theta + W_{222}y_0^2 \rho^2 \cos^2\theta + \ldots, \quad (1)$$

and the normalized test beam wavefront can be expressed as a wave function $W_T(s\rho,\theta)$, which can be expanded as $$W_T(s\rho,\theta) = W_0 + W_{20}(s\rho)^2 + W_{040}(s\rho)^4 + W_{131}y_0(s\rho)^3 \cos\theta + W_{222}y_0^2(s\rho)^2 \cos^2\theta + \ldots, \quad (2)$$

where $\rho$ and $\theta$ are polar coordinates over a circle of unit radius defining the entrance pupil for the incoming beam, the coefficients $W_n$ are the expansion coefficients for the different terms of the Zernike polynomial, $y_0$ is the field height of the pupil, and s is the magnification ratio between the two interfering beams. The expression for the resulting interference pattern can be written as $\Delta W = W_R - W_T$, which takes the form $$\Delta W = -W_0 + W_{20}(1-s^2)\rho^2 + W_{040}(1-s^4)\rho^4 + W_{131}(1-s^3)\rho y_0^3 \cos\theta + W_{222}(1-s^2)\rho^2 y_0 \cos^2\theta + \ldots. \quad (3)$$

A number of techniques have been used in the prior art for obtaining real-time interferometric data from conventional interferometers. One such technique, which likewise has relevance to the present invention, is characterized generally as phase-shifting interferometry. Heretofore, however, no feasible method had been known for using a radial shear interferometer in practicing phase-shifting interferometry.

In general, the intensity $I(x,y)$ of an optical interference pattern can be expressed by the equation $$I(x,y) = I_0(x,y)[1 + \gamma \cos \phi(x,y) + \delta], \quad (4)$$

where $I_0(x,y)$ is the average intensity, $\gamma$ is the fringe contrast, and $\phi(x,y) = (2\pi/\lambda)W(x,y)$ is the phase value to be measured, and $\delta$ is an arbitrary relative phase constant. If the values of intensity are measured at three different shifted phase values, the unknown values of $\phi(x,y)$ can be deduced without $2\pi$ modulus ambiguity. Thus, by selecting the values $\delta = \pi/4$, $\delta 3\pi/4$ and $\delta = 5\pi/4$ for the relative phase constant, the intensity $I_A$ at $\delta = \pi/4$ is given by $$I_A(x,y) = I_0\left[1 + \gamma\cos\left(\phi(x,y) + \frac{\pi}{4}\right)\right] \quad (5)$$

$$= I_0[1 + \gamma\{\cos\phi(x,y) - \sin\phi(x,y)\}/\sqrt{2}\,],$$

the intensity $I_B$ at $\delta = 3\pi/4$ is given by $$I_B(x,y) = I_0\left[1 + \gamma\left(\cos\phi(x,y) + \frac{3\pi}{4}\right)\right] \quad (6)$$

$$= I_0[1 + \gamma\{-\cos\phi(x,y) - \sin\phi(x,y)\}/\sqrt{2}\,],$$

and the intensity $I_C$ at $\delta = 5\pi/4$ is given by $$I_C(x,y) = I_0\left[1 + \gamma\left(\cos\phi(x,y) + \frac{5\pi}{4}\right)\right] \quad (7)$$

$$= I_0[1 + \gamma\{-\cos\phi(x,y) + \sin\phi(x,y)\}/\sqrt{2}\,].$$

Combining equations (5), (6) and (7) yields $$\tan\phi(x,y) = \frac{I_C - I_B}{I_A - I_B}, \quad (8)$$

which can be rewritten in the form $$\phi(x,y) = \tan^{-1}\frac{I_C - I_B}{I_A - I_B}. \quad (9)$$

In conventional phase-shifting interferometry, electro-optical devices, polarizing beam-splitters, waveplates or piezoelectric transducers have been used to introduce a constant amount of phase change into interference patterns detected by solid-state array detectors located at the image plane of the interferometric system. In that way, the intensity measurements $I_A$, $I_B$ and $I_C$ could be made for $$\delta = \pi/4,\ \delta = 3\pi/4\ \text{and}\ \delta = 5\pi/4,$$

respectively, from which $\phi(x,y)$ can be calculated. However, in the prior art, the only way the various intensity values $I_A$, $I_B$ and $I_C$ could be measured was serially using sequential phase shifting methods. Instantaneous monitoring of the phase of the wavefront was not achieved in the prior art.

SUMMARY OF THE INVENTION

The present invention involves a modification of a conventional radial shear interferometer, whereby monitoring of the quality of an optical wavefront in real time can be achieved.

In accordance with the present invention, an optical beam whose wavefront is to be monitored is divided into two components, which are directed into corresponding arms of a radial shear interferometer. Diffraction gratings are provided to produce a plurality of diffraction orders in each arm of the interferometer. The diffraction gratings also introduce a selected phase difference (e.g., ±90°) between corresponding diffraction orders in the two arms of the interferometer. Using only the zeroth-order and the positive and negative first-order diffraction orders of each beam component, three phase-shifted interferograms (i.e., one for each diffraction order) are simultaneously obtained. Changes in the phase of the wavefront being monitored are indicated by changes observed in the intensity modulation of the fringes of the interferograms.

DESCRIPTION OF THE DRAWING

FIG. 2 is a schematic representation of a conventional radial shear interferometer in triangular format.

FIG. 3 is a schematic representation of a real-time radial shear interferometer in accordance with the present invention.

FIG. 4 is an enlarged view of a portion of one of the diffraction gratings of the interferometer shown in FIG. 3.

BEST MODE OF CARRYING-OUT THE INVENTION

Figure 1:
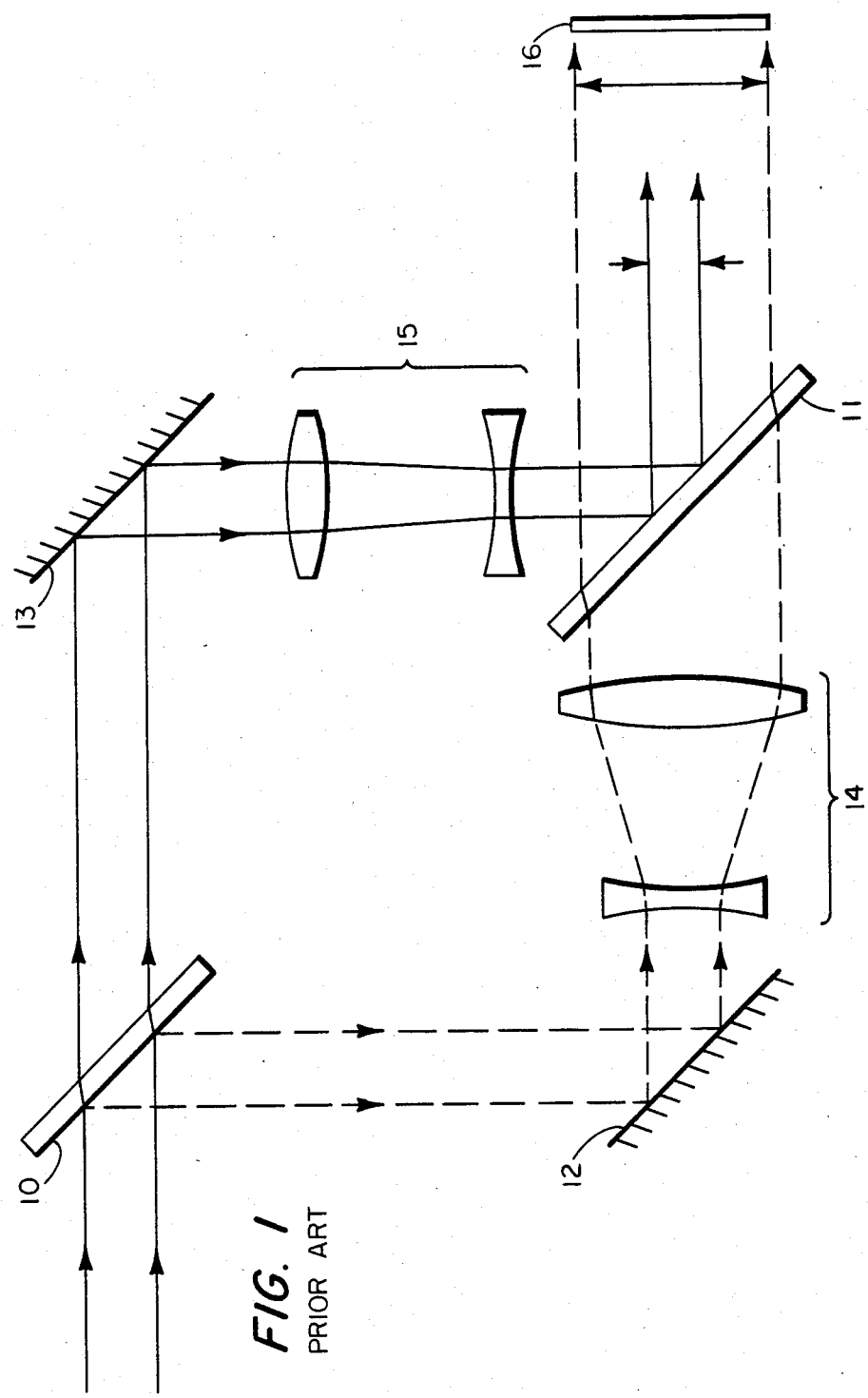
FIG. 1 is a schematic representation of a conventional radial shear interferometer in Mach-Zehnder format.

A preferred embodiment of a real-time radial shear interferometer according to the present invention is illustrated schematically in FIG. 3, which shows diffraction gratings 30 and 31 positioned in corresponding arms of an interferometer in Mach-Zehnder format. A Mach-Zehnder interferometer characteristically has two arms defining a parallelogram. In the embodiment of FIG. 3, the two arms of the interferometer define a rectangle. An input beam whose wavefront is to be monitored for aberrations is shown in FIG. 3 as incident upon a first beamsplitter 40, which transmits one component of the input beam into a first arm of the interferometer and reflects another component of the input beam into a second arm of the interferometer.

The transmitted component (whose boundary rays are indicated in FIG. 3 by solid lines) is directed via a first afocal telescope 41 (comprising a focussing lens element 42 and a re-collimating lens element 43) along a portion of the first arm of the interferometer toward a first beam-folding mirror 44. The diffraction grating 30 is positioned in the first arm of the interferometer at the focal plane of the focussing lens element 42.

In the absence of the grating 30, the afocal telescope 41 would merely expand the cross-sectional diameter of the transmitted component of the input beam. However, the grating 30 causes the transmitted component to be separated into a plurality of diffraction maxima, which are transmitted as a plurality of diverging and spatially separated diffraction beams. The diffraction beams are gathered and rendered parallel to each other by the re-collimating lens element 43, which directs the diffraction beams to the mirror 44. The three diffraction beams resulting from the zeroth-order and the positive and negative first-order diffraction maxima are the only diffraction beams produced by the grating 30 and the telescope 41 that are used in practicing the preferred embodiment of the present invention. The zeroth-order and the positive and negative first-order diffraction beams produced by the grating 30 and the telescope 41 are reflected by the mirror 44 parallel to each other along another portion of the first arm of the interferometer to a second beamsplitter 45.

The reflected component (whose boundary rays are indicated in FIG. 3 by broken lines) is reflected by the first beamsplitter 40 to a second beam-folding mirror 46 along a portion of the second arm of the interferometer, which is parallel to the three diffraction beams that are reflected from the first beam-folding mirror 44 to the second beamsplitter 45 in the first arm of the interferometer. The mirror 46 reflects the reflected component of the input beam via a second afocal telescope 47 (comprising a focussing lens element 48 and a re-collimating lens element 49) along another portion of the second arm of the interferometer toward the second beamsplitter 45. The diffraction grating 31 is positioned in the second arm of the interferometer at the focal plane of the focussing lens element 48.

In the absence of the grating 31, the afocal telescope 47 would merely expand the cross-sectional diameter of the reflected component of the input beam. However, the grating 31 causes the reflected component to be separated into a plurality of diffraction maxima, which are transmitted as a plurality of diverging and spatially separated diffraction beams. The diffraction beams are gathered and rendered parallel to each other by the re-collimating lens element 49, which directs the diffraction beams to the beamsplitter 45. The three diffraction beams resulting from the zeroth-order and the positive and negative first-order diffraction maxima are the only diffraction beams produced by the grating 31 and the telescope 47 that are used in practicing the preferred embodiment of the present invention.

The focal lengths and the radii of curvature of the lens elements 48 and 49 are such that the magnification ratio of the telescope 47 is different from the magnification ratio of the telescope 41 by a predetermined amount. Consequently, the grating 31 and the telescope 47 cooperate to produce a zeroth-order and two first-order diffraction beams whose diameters are different by a predetermined amount from the diameters of the corresponding zeroth-order and two first-order diffraction beams produced by the grating 30 and the telescope 41. In the embodiment of FIG. 3, the telescope 47 is shown to have a larger magnification ratio than the telescope 41.

A portion of each diffraction beam formed from the transmitted component of the input beam is reflected by the second beamsplitter 45 to an image plane. Similarly, a portion of each diffraction beam formed from the reflected component of the input beam is transmitted by the second beamsplitter 45 to the image plane. In the preferred embodiment of the invention as illustrated in FIG. 3, three independent array detectors 50, 51 and 52 are located at the image plane. The array detector 50 is positioned to detect the portions of the zeroth-order diffraction beams formed from the transmitted and the reflected components of the input beam. Likewise, the array detector 51 is positioned to detect the portions of the positive first-order diffraction beams, and the array detector 52 is positioned to detect the portions of the negative first-order diffraction beams. However, in an alternative embodiment, a single array detector could be used, in which case the portions of the diffraction beams of each diffraction order formed from the transmitted and reflected components of the input beam would be incident upon corresponding distinct areas of the single array detector.

The Mach-Zehnder format of the interferometer of FIG. 3 assures that the portions of the three diffraction beams transmitted by the second beamsplitter 45 concentrically overlap the portions of the corresponding three diffraction beams transmitted by the second beamsplitter 45. Thus, the portions of the overlapping diffraction beams formed from the transmitted and reflected components of the input beam for each diffraction order interfere with each other at the image plane, and interferograms for the zeroth-order and for the positive and negative first-order diffraction beams are produced on the array detectors 50, 51 and 52, respectively.

FIG. 3 illustrates a first interferogram formed on the array detector 50 by interference of the two zeroth-order diffraction beams of different diameter produced in the respective arms of the interferometer, a second interferogram formed on the array detector 51 by interference of the two positive first-order diffraction beams of different diameter, and a third interferogram formed on the array detector 52 by interference of the two negative first-order diffraction beams of different diameter. The three interferograms are formed simultaneously and independently of each other, and can be imaged and/or recorded by conventional devices available for the purpose.

The interferometer of FIG. 3 inherently produces a phase shift between each of the first-order diffraction beams and the zeroth-order diffraction beam. This phase shift can be shown to exist by Fourier analysis. The generalized transmission function of each of the diffraction gratings 30 and 31 can be written as $$G(x,y) = \sum_n g_n \exp(i\, 2\pi\, n\xi\, x), \tag{10}$$

where the coefficients $g_n$ can be complex, $\xi$ is the fundamental grating line frequency, and the y dependence is constant. Translating the grating laterally by an amount $x_g$ with respect to the optical axis, as illustrated in the enlarged view of FIG. 4, results in a phase shift in equation (10) such that $$G(x - x_g, y) = \sum_n g_n \exp[i\, 2\pi\, n\xi(x - x_g)]. \tag{11}$$

Fourier transformation of equation (11) yields a series of phase-shifted delta functions in which the magnitude of the phase shift is given by $$\Delta = 2\pi n \xi x_g + \text{phase}(g_n) \tag{12}$$

If $\xi x_g = \frac{1}{4}$, the condition for a $\pm 90°$ phase shift of the first-order diffraction beams with respect to the zeroth-order diffraction beam would be satisfied. The minimum grating frequency is set by $$\xi > 1/(\lambda F) \tag{13}$$

in order to insure spatial separation of the zeroth-order and the two first-order diffraction beams, where $\lambda$ is the wavelength and F is the aperture ratio of the input beam. The concentricity of the corresponding diffraction beams forming each of the three interferograms illustrated in FIG. 3 establishes a simple relationship between the line frequencies of the gratings and the focal lengths of the lens elements of the afocal telescopes.

In operation, one of the components of the input beam (e.g., the transmitted component) can be considered as the test beam, and the other component of the input beam (e.g., the reflected component) can be considered as the reference beam. Since the corresponding diffraction beams forming each interferogram are concentric with respect to each other, the centers of the corresponding first-order diffraction beams have the same height h relative to the optic axis of the interferometer. Thus, for both the positive and the negative first-order interferograms, $h_R = h_T$, where $h_R$ is the center of the first-order diffraction beam produced from the reference beam, and where $h_T$ is the center of the first-order diffraction beam produced from the test beam.

The radial shear ratio s is defined as $$s = H_T/H_R = f_{2T}/f_{2R}$$

where the condition $0 < s < 1$ is always satisfied, and where $f_{2T}$ and $f_{2R}$ are the focal lengths of the re-collimating lens elements 43 and 49 of the afocal telescopes 41 and 47, respectively.

Combining equation (3) with the grating equation $$\sin\theta = \lambda\xi \tag{15}$$

where $\theta$ is the diffraction angle for the positive and negative first-order diffraction beams, yields the condition that $$\xi_R f_{2R} = \xi_T f_{2T}. \tag{16}$$

Equation (16) establishes the relationship between the grating line frequencies of the gratings 30 and 31 and the focal lengths of the re-collimating lens elements 43 and 49, which determines the radial shear ratio.

A particular embodiment have been described herein for a real-time radial shear interferometer in accordance with the present invention. However, other embodiments suitable for particular applications would become apparent to workers skilled in the art upon perusal of the foregoing specification and accompanying drawing. The description presented herein is to be understood as being illustrative of the invention, which is more generally defined by the following claims and their equivalents.

I claim:

1. An apparatus for measuring wavefront phase of an optical beam, said apparatus comprising:
   (a) means for splitting said beam into a first component and a second component, said first component propagating along a first optical path and said second component propagating along a second optical path;
   (b) diffraction grating means positioned in said first and second optical paths to produce a plurality of spatially separated diffraction beams corresponding to maxima of particular diffraction orders for each of said first and second components;
   (c) means for combining diffraction beams for said first component with corresponding diffraction beams for said second component, thereby producing:
      (i) a zeroth-order interferogram from combined diffraction beams of zeroth order for said first and second components,
      (ii) an interferogram of a specified higher order from combined diffraction beams of positive order of said specified higher order for said first and second components, and
      (iii) an interferogram of said specified higher order from combined diffraction beams of negative order of said specified higher order for said first and second components,
      said interferograms being produced simultaneously and being spatially separated from each other; and
   (d) detector means for simultaneously measuring intensity variations in each of said interferograms.

2. The apparatus of claim 1 wherein said means for combining said diffraction beams produces a zeroth-order interferogram, a positive first-order interferogram and a negative first-order interferogram, said negative first-order interferogram being out of phase by 180° from said positive first-order interferogram.

3. A radial shear interferometer comprising:
(a) first and second beamsplitters and first and second mirrors disposed in Mach-Zehnder format, said first beamsplitter and said first mirror defining a first arm of said interferometer, said second beamsplitter and said second mirror defining a second arm of said interferometer, said first beamsplitter dividing an input beam into a transmitted component propagated along said first arm of said interferometer and a reflected component propagated along said second arm of said interferometer;
(b) a first afocal telescope disposed in said first arm of said interferometer, and a second afocal telescope disposed in said second arm of said interferometer, said first and second afocal telescopes having different magnification ratios;
(c) a first diffraction grating disposed in said first arm of said interferometer to produce a plurality of spatially separated diffraction beams corresponding to maxima of particular diffraction orders for said transmitted component of said input beam, and a second diffraction grating disposed in said second arm of said interferometer to produce a plurality of spatially separated diffraction beams corresponding to maxima of particular diffraction orders for said reflected component of said input beam, said diffraction beams of said transmitted component being combined by said second beamsplitter with said diffraction beams of said reflected component to produce:
  (i) a zeroth-order interferogram from combined diffraction beams of zeroth order for said transmitted and reflected components,
  (ii) an interferogram of a specified higher order from combined diffraction beams of positive order of said specified higher order for said transmitted and reflected components, and
  (iii) an interferogram of said specified higher order from combined diffraction beams of negative order of said specified higher order for said transmitted and reflected components,
said interferograms being produced simultaneously and being spatially separated from each other; and
(d) detector means for simultaneously measuring intensity variations in each of said interferograms.

4. The interferometer of claim 3 wherein each of said first and second diffraction gratings has a grating period such as to produce a phase shift of $\pi/2$ between said interferogram of positive higher order and said zeroth-order interferogram where said positive higher order is positive first order, and to produce a phase shift of $-\pi/2$ between said interferogram of negative higher order and said zeroth-order interferogram where said negative higher order is negative first order.

* * * * *